Patented Jan. 12, 1926.

1,569,251

UNITED STATES PATENT OFFICE.

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY.

METHOD OF PREPARING CLAY OR BODY COMPOSITION FOR CERAMIC ARTICLES.

No Drawing.   Application filed March 1, 1923. Serial No. 621,971.

*To all whom it may concern:*

Be it known that I, ARTHUR O. AUSTIN, a citizen of the United States, residing in Barberton, county of Summit, State of Ohio, have invented certain new and useful Methods of Preparing Clay or Body Composition for Ceramic Articles, of which the following is a specification.

This invention relates to the preparation of the clay and other ingredients from which ceramic articles such as insulators and other devices are manufactured, and has for its object the provision of a method whereby the materials for such articles may be more readily, economically and efficiently mixed, thus facilitating the manufacture of such articles and producing improved results.

The invention is exemplified in the steps of the process described in the following specification, and it is more particularly pointed out in the appended claims:

In the forming of ceramic articles and more particularly the vitrified or semi-vitrified materials, it is necessary that the body mix composed of clays, feldspar, flint, Cornwall stone, whiting or other ingredients be thoroly mixed and free from large size grains of any of the ingredients, and foreign material such as lignite, iron or other material.

In order to accomplish this result, it has been the practice to add the clay, flint, feldspar and any other ingredients to approximately the same weight of water and mix the whole thoroly by the use of a blunger mill or pebble mill to form a thin mixture called slip. This slip usually contains from seventy per cent to fifty per cent water in order to make it thin enough so that the slip may be screened or lawned to remove sand and other coarse particles.

With the exception of casting operations the slip is usually too thin to be used, and even for most casting operations the slip is usually too thin to be used and some of the water must be removed. This water has been removed by the use of a filter press either of the intermittent or continuous type. In the pressing operation it is customary to remove a considerable portion of the excess water as the clay is not stiff enough to be formed until the water content is reduced to between twenty per cent to twenty-five per cent of the total weight.

The pressing of the clay requires considerable expense for labor and filter press sacks and the clay as it comes from the filter presses is not uniform as to water content, some parts being rather hard and other parts soft. There is also a tendency for the particles of various sizes to segregate in the filter press leaf, the coarser particles often collecting in the center of the leaf. This segregation causes streaks in the clay which may cause cracking, warping or affect the dielectric strength or properties in high voltage insulators, where uniformity of composition is of particular importance, in order to withstand the relatively high electrical and mechanical stresses and to provide a high and uniform vitrification to prevent destruction of dielectric strength by absorption.

In the improved method, a more uniform product is obtained and the cost and uncertainty of some of the operations is reduced or eliminated. The improved method also prevents the entry or contamination with dirt and lint, from the filters, etc., during and following the pressing operation.

The handling of the materials is also simplified, as much of the hand work in pressing and storing is eliminated.

In the improved method the operation is substantially as follows: The dry ground materials such as flint, feldspar, and whiting are screened dry to eliminate any foreign materials or oversize particles. This separation may be effected by the regular screening or bolting method or air separation, or a combination of the two.

The lumpy plastic clays are mixed with sufficient water to make a slip thin enough so that it can be lawned or screened to remove oversize particles or foreign material. This requires approximately the same weight of water as dry material. After the clay mixed with water has been lawned, the screened dry ingredients are added. Pieces of dry or damp clean unfired ware that is cracked or has become broken may be added without screening. The whole mass which will then be made of approximately thirty to thirty-five percent water and seventy percent solids is thoroughly mixed while heated in a steam jacketed chamber. The heat tends to thin the mixture and facilitates mixing. As the clay or slip is not thick enough for ordinary forming, the mass is heated up by the use of a water jacket and from seven to ten percent water evaporated.

By using a multiple still or a vacuum, the evaporation may be made very economically and at a temperature which will not harm the working properties of the clay. The mixture may be worked to facilitate evaporation and prevent formation of crust.

By removing only a portion of the excess water so that the resulting body has approximately twenty-five to twenty-eight per cent water the thickened slip or body may be handled in a suitably lined pipe. If a stiffer material is needed further dewatering may be accomplished by applying heat and vacuum during or before pugging.

The material may be conveniently transferred from the mixing to the forming room through conduits in this way.

I claim:

1. In the manufacture of ceramic articles the process of mixing the material therefor, wherein a portion of the material is prepared with a sufficient percentage of water to render it fluidic, and another portion is prepared in dry condition and the two portions are mixed together to provide a body mix, having a percentage of water slightly greater than that at which the ceramic articles are formed, the excess of water being removed by evaporation to condition the mix for forming articles.

2. In the manufacture of ceramic articles the process of mixing the material therefor, wherein a portion of the material is prepared with a sufficient percentage of water to render it fluidic, and another portion is prepared in dry condition and the two portions are mixed together to provide a body mix, having a percentage of water slightly greater than that at which the ceramic articles are formed, the excess of water being sufficient to permit the mix to be transported thru conduits and the excess of water removed by evaporation to condition the mix for forming.

3. The process of manufacturing ceramic articles wherein the material from which the articles are formed is prepared by mixing a portion thereof with water to produce sufficient fluidity to permit screening, while another portion is powdered and screened dry, the portions after screening being mixed together to produce a body mix, having a percentage of water slightly in excess of that desirable for forming the excess being removed by evaporation.

4. The method of preparing material for ceramic articles, wherein clay is mixed with water to form a relatively thin slip which is screened to remove coarse material and subsequently mixed with screened powdered ingredients to produce a mix having a percentage of water approximating thirty percent.

5. The method of preparing material for ceramic articles, wherein clay is mixed with water to form a relatively thin slip which is screened to remove coarse material and subsequently mixed with screened powdered ingredients to produce a mix having a percentage of water approximating thirty percent, after which from seven to ten percent of water is removed by evaporation to prepare the mixture for forming.

6. The process of preparing material for ceramic articles, wherein clay is mixed with an approximately equal weight of water to form a slip having sufficiently fluidity to permit screening, adding to said slip after it has been screened a sufficient amount of powdered dry screened material to produce a composition having approximately thirty percent of water and mixing the resulting composition while heated.

7. The process of preparing material for ceramic articles, wherein clay is mixed with an approximately equal weight of water to form a slip having sufficient fluidity to permit screening, adding to said slip after it has been screened a sufficient amount of powdered dry screened material to produce a composition having approximately thirty per cent of water, mixing the resulting composition while heated and subsequently removing from seven to ten per cent of the water by evaporation.

8. The method of preparing material for ceramic articles, wherein substantially equal parts of clay and water are mixed together to produce a slip having sufficient fluidity to permit screening to remove coarse material therefrom, while other ingredients are screened in dry powdered form and added to the screened slip in sufficient proportion to produce a mix having approximately thirty percent of water, a thorough mixture of the wet and dry materials being secured by heating and agitating in a jacketed container after which water is removed by evaporation to condition the material for forming.

9. The process of preparing material for ceramic articles comprising the steps of mixing tough plastic clay with sufficient water to permit the mixture to be launed, adding to the launed mixture dry material which has been launed or from which any oversized particles have been otherwise removed and working the resulting mass under heat in a vacuum until its water content is reduced sufficiently to give the proper consistency for forming.

10. The process of preparing material for ceramic ware wherein tough plastic clay is mixed with approximately an equal weight of water to provide a slip; the slip launed; sufficient dry launed ingredients added to the slip to give a mixture having approximately thirty to thirty-five per cent water, the wet and dry constituents being thoroughly mixed, after which the mass is worked in a vacuum while heated until the water content is sufficiently reduced to permit forming into ware for burning.

11. The process of preparing material for ceramic ware wherein wet and dry portions are separately prepared and mixed in proportion to afford sufficient water to allow mixing to produce a homogeneous mass after which the mass is worked in a vacuum while heated to reduce the water content sufficiently to stiffen the clay for forming.

12. The process of preparing material for ceramic ware wherein a part of the ingredient is mixed wet and a part having other characteristics is mixed dry, a sufficient amount of the dry material being added to the wet to reduce the percentage of water as much as can be done and yet permit thorough mixing after which the resulting mass is dried to a consistency to permit forming into ware, the drying being done by heating in a vacuum while the mass is worked to facilitate evaporation and prevent formation of crust.

13. The process of preparing material for ceramic ware comprising the steps of mixing clay with water to a consistency to permit launing to remove oversized material, launing powdered ingredients dry, thoroughly mixing the lawned wet and dry ingredients in proportion to give as low a percent of moisture as is consistent with thoroughly mixing and reducing the water content by heating in a vacuum while the mass is worked to facilitate evaporation and prevent crusting.

14. The process of manufacturing ceramic articles in which the material is transferred from one location to another, the process comprising the steps of mixing a portion of clay with a sufficient percentage of water to render it fluidic and preparing another portion in dry condition, after which the two portions are mixed together to provide a body mix having a percentage of water slightly greater than that at which the ceramic articles are formed, the mix being transferred through a conduit while in this condition, after which the excess of water is removed by evaporation to condition the mix for forming.

In testimony whereof I have signed my name to this specification on this 24th day of February, A. D. 1923.

ARTHUR O. AUSTIN.